US012600044B2

(12) United States Patent (10) Patent No.: US 12,600,044 B2
Na (45) Date of Patent: Apr. 14, 2026

(54) GUIDE DOG ROBOT FOR THE VISUALLY IMPAIRED PERSONS AND CONTROL METHOD THEREOF

(71) Applicant: ELECTRONICS AND TELECOMMUNICATIONS RESEARCH INSTITUTE, Daejeon (KR)

(72) Inventor: Ki In Na, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 90 days.

(21) Appl. No.: 18/897,430

(22) Filed: Sep. 26, 2024

(65) Prior Publication Data

US 2025/0303577 A1     Oct. 2, 2025

(30) Foreign Application Priority Data

Mar. 28, 2024     (KR) ........................ 10-2024-0042618

(51) Int. Cl.
  *B25J 11/00*      (2006.01)
  *A01K 27/00*      (2006.01)
  *A61H 3/06*      (2006.01)
(52) U.S. Cl.
  CPC ........... *B25J 11/008* (2013.01); *A01K 27/002* (2013.01); *A61H 3/06* (2013.01)
(58) Field of Classification Search
  CPC ........ B25J 11/008; B25J 9/163; B25J 13/088; B25J 19/0091; A01K 27/002; A61H 3/06;

A61H 2201/1652; A61H 2201/5061; A61H 3/061; A61H 2003/063; A61H 2201/0153; A61H 2201/0157; A61H 2201/0173; A61H 2201/1207; A61H 2201/1635;

(Continued)

(56) References Cited

U.S. PATENT DOCUMENTS

2019/0282433 A1*  9/2019  Higgins ................. G05D 1/622
2022/0024046 A1   1/2022  Jang et al.
2023/0008482 A1   1/2023  Yang

FOREIGN PATENT DOCUMENTS

JP          2580978 Y2    9/1998
JP       2019084670 A     6/2019

(Continued)

*Primary Examiner* — Jason Holloway
*Assistant Examiner* — Elizabeth Rose Neleski
(74) *Attorney, Agent, or Firm* — LRK PATENT LAW FIRM

(57)          ABSTRACT

A guide dog robot for visually impaired persons is provided. The guide dog robot includes a harness unit configured to grip a visually impaired person, a spring damper unit connected to the harness unit and configured to move in an axial direction, based on an external force acting between the visually impaired person and the guide dog robot, and a body part configured to perform movement based on a movement intention of the visually impaired person and a moving motion of the guide dog robot, the body part including an upper surface with the spring damper unit mounted thereon. Each of the harness unit, the spring damper unit, and the body part comprises an inertia measurement unit (IMU), and the IMU measures a position and a speed at a position at which the IMU is equipped.

14 Claims, 6 Drawing Sheets

(58) Field of Classification Search
      CPC ...... A61H 2201/501; A61H 2201/5064; A61H
                     2201/5079; B62D 57/032
      See application file for complete search history.

(56) <div align="center">References Cited</div>

<div align="center">FOREIGN PATENT DOCUMENTS</div>

| KR | 10-1321187 | B1 | 10/2013 |
|----|------------|-----|---------|
| KR | 10-2020-0081172 | A | 7/2020 |
| KR | 10-2237981 | B1 | 4/2021 |
| KR | 10-2022-0083878 | A | 6/2022 |
| KR | 10-2023-0093933 | A | 6/2023 |

* cited by examiner

110  HARNESS UNIT

120  SPRING DAMPER UNIT

130  BODY PART

100

111  IMU

121  IMU

131  IMU 120-1

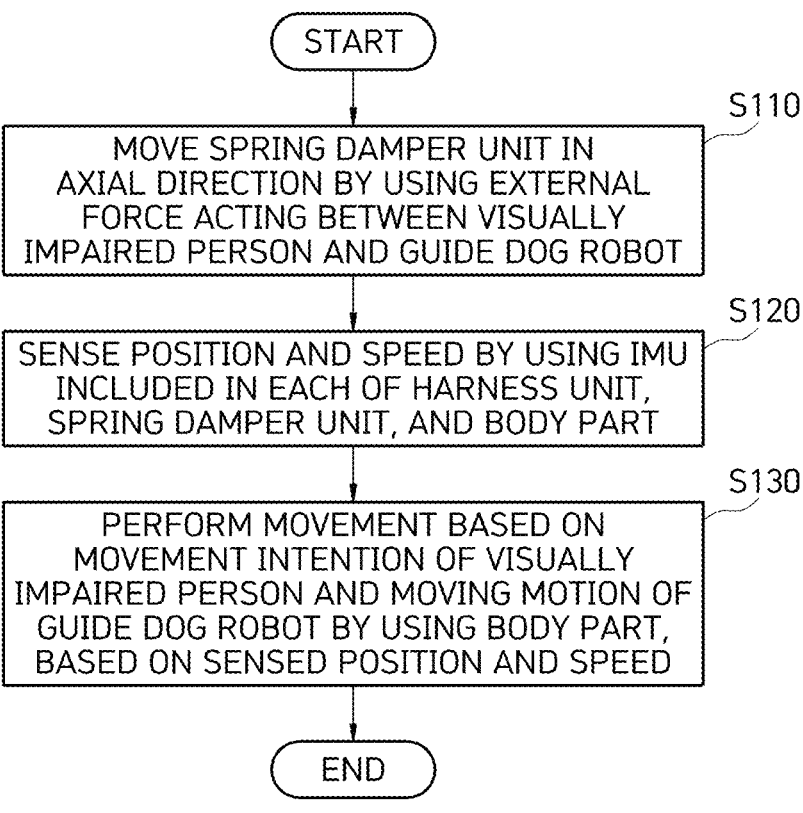

START

MOVE SPRING DAMPER UNIT IN
AXIAL DIRECTION BY USING EXTERNAL
FORCE ACTING BETWEEN VISUALLY
IMPAIRED PERSON AND GUIDE DOG ROBOT
— S110

SENSE POSITION AND SPEED BY USING IMU
INCLUDED IN EACH OF HARNESS UNIT,
SPRING DAMPER UNIT, AND BODY PART
— S120

PERFORM MOVEMENT BASED ON
MOVEMENT INTENTION OF VISUALLY
IMPAIRED PERSON AND MOVING MOTION OF
GUIDE DOG ROBOT BY USING BODY PART,
BASED ON SENSED POSITION AND SPEED
— S130

END

GUIDE DOG ROBOT FOR THE VISUALLY IMPAIRED PERSONS AND CONTROL METHOD THEREOF

CROSS-REFERENCE TO RELATED APPLICATION(S)

This application claims the benefit of the Korean Patent Application No. 10-2024-0042618 filed on Mar. 28, 2024, which is hereby incorporated by reference as if fully set forth herein.

BACKGROUND

1. Field of the Invention

The present invention relates to a guide dog robot for visually impaired persons and a control method thereof.

2. Description of the Related Art

Guide dogs act as a helper necessary for visually impaired persons. However, there are many difficulties in a process of training or rehoming guide dogs actually.

In such a situation, as quadruped robot technology advances recently, research on guide dog robots is being actively done. Such guide dog robots should maintain stable control through harness and determine an intention of a user to safely guide a visually impaired person.

However, in guide dog robots which are being currently developed or researched, the refinedness and solidity of a harness are low, and due to this, there is a problem where the lifetime of a mechanism unit is shortened. Therefore, it is required to research and develop guide dog robot technology to which new harness technology for visually impaired persons is applied.

PRIOR ART REFERENCE

Patent Document

Korean Patent Publication No. 10-2020-0081172 (July 7, 2020)

SUMMARY

An aspect of the present invention is directed to providing a guide dog robot for visually impaired persons and a control method thereof, which may secure the stable control of the guide dog robot, enabling the safe way guide of a visually impaired person, against an external force and may provide the visually impaired person with an intuitive interaction with a guide dog robot simultaneously.

The objects of the present invention are not limited to the aforesaid, but other objects not described herein will be clearly understood by those skilled in the art from descriptions below.

To achieve these and other advantages and in accordance with the purpose of the invention, as embodied and broadly described herein, there is provided a guide dog robot for visually impaired persons, the guide dog robot including: a harness unit configured to grip a visually impaired person; a spring damper unit connected to the harness unit and configured to move in an axial direction, based on an external force acting between the visually impaired person and the guide dog robot; and a body part configured to perform movement based on a movement intention of the visually impaired person and a moving motion of the guide dog robot, the body part including an upper surface with the spring damper unit mounted thereon. In this case, each of the harness unit, the spring damper unit, and the body part includes an inertia measurement unit (IMU), and the IMU measures a position and a speed at a position at which the IMU is equipped.

In another aspect of the present invention, there is provided a control method of a guide dog robot for visually impaired persons, the control method including: a step of moving a spring damper unit, connected to a harness unit gripped by a visually impaired person, in an axial direction by using an external force acting between the visually impaired person and the guide dog robot; a step of sensing a position and a speed at an equipped position by using an inertia measurement unit (IMU) included in each of the harness unit, the spring damper unit, and a body part with the spring damper unit mounted on an upper surface thereof; and a step of performing movement based on a movement intention of the visually impaired person and a moving motion of the guide dog robot by using the body part, based on the sensed position and speed.

In another aspect of the present invention, there is provided a guide dog robot for visually impaired persons, the guide dog robot including: a communication module configured to receive sensing data of an inertia measurement unit (IMU) included in each of a harness unit gripped by a visually impaired person, a spring damper unit connected to the harness unit, and a body part with the spring damper unit mounted on an upper surface thereof; a memory configured to store a program for performing a movement of the guide dog robot, based on the sensing data; and a processor configured to, as the spring damper unit moves in an axial direction with an external force acting between the visually impaired person and the guide dog robot by executing the program stored in the memory, obtain a position and a speed at an equipped position, based on the sensing data from each IMU, and control movement based on the movement intention of the visually impaired person and the moving motion of the guide dog robot, based on the obtained position and speed.

It is to be understood that both the foregoing general description and the following detailed description of the present invention are exemplary and explanatory and are intended to provide further explanation of the invention as claimed.

BRIEF DESCRIPTION OF THE DRAWINGS

FIG. 7 is a flowchart of a control method of a guide dog robot for visually impaired persons according to an embodiment of the present invention.

DETAILED DESCRIPTION OF THE INVENTION

Figure 1:
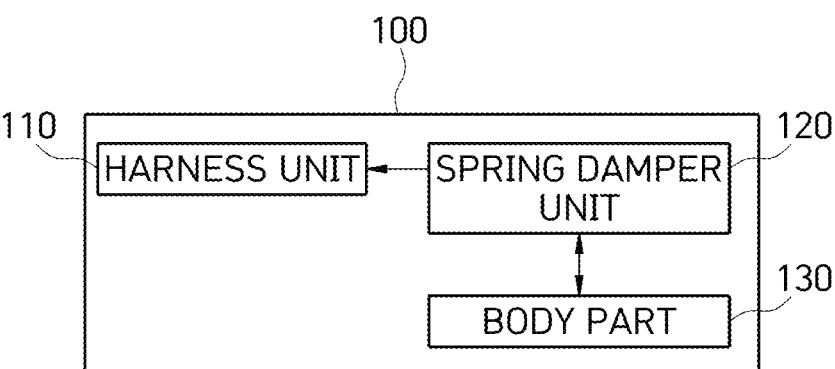
FIG. 1 is a block diagram of a guide dog robot for visually impaired persons according to an embodiment of the present invention.

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Herein, like reference numeral refers to like element, and "and/or" include(s) one or more combinations and each of described elements. Although "first" and "second" are used for describing various elements, but the elements are not limited by the terms. Such terms are used for distinguishing one element from another element. Therefore, a first element described below may be a second element within the technical scope of the present invention.

Unless otherwise defined, all terms (including technical and scientific terms) used herein may be used as a meaning capable of being commonly understood by one of ordinary skill in the art. Also, terms defined in dictionaries used generally are not ideally or excessively construed unless clearly and specially defined.

Hereinafter, a background of the present invention will be described for helping understanding of those skilled in the art.

Recently, as guide dog robot technology advances, research is being actively done on a guide system using a quadruped walking robot which replaces or complements a guide dog. Such a system may help safe and efficient movement through an intuitive and stable interaction with a visually impaired person, and in this case, a harness may play an important role.

A guide dog robot should maintain stable control on a user through a harness and determine an intention of a user to adjust a movement direction and a speed. For example, it may be essential to quickly determine a movement intention of the user, for maintaining a constant interval between the user and the guide dog robot and changing mutual formation.

Furthermore, in a conventional guide dog robot, when the guide dog robot receives left and right commands through a button and recognizes an intention of a user, the guide dog robot may perform only direction switch vertically or by a certain angle and may be impossible to provide visual feedback, and due to this, there may not be a method which enables a visually impaired person to check the degree to which the guide dog robot changes movement.

Moreover, in a conventional harness structure, when a durable harness used by a guide dog is directly connected to a robot, a visually impaired person may directly apply a suddenly external force to a guide dog robot, and due to this, the control of the guide dog robot may be unstable. Also, a movement change of the guide dog robot may be directly transferred to a wrist of the visually impaired person, causing inconvenience to the guide dog robot.

In a case where a harness is loosely connected to a visually impaired person by a string or a rod in a snell form, because there is no a directly strong reaction, the visually impaired person should precisely recognize a movement of a guide dog robot with a wire or a rod. This may need a high concentration of the visually impaired person, and due to this, may disrupt an orientation. Also, because the visually impaired person is difficult to recognize a motion of the guide dog robot for avoiding a front obstacle, the discontinuity of mobility capability where the guide dog robot should transfer may occur. Furthermore, because the visually impaired person may not physically provide the guide dog robot with a control command for a forward-direction movement, a control method which is not intuitive may be used, and this may need an additional interaction medium such as a button.

Finally, a harness which is configured with a motor mechanism unit equipped with an encoder may quickly determine and smoothly transfer a motion of a guide dog robot and an intention of a visually impaired person through a haptic device capable of 6-axis control, but this may cause much power consumption and an excessive load to the guide dog robot. Also, the lifetime of a motor and a mechanism unit may be shortened due to a continuous external force, and due to this, there may be a problem where continuous maintenance is needed.

To solve such a problem, in a guide dog robot for visually impaired persons and a control method thereof according to an embodiment of the present invention, a spring damper unit may be additionally equipped between a harness unit and a body part of the guide dog robot and may smoothly and immediately transfer, to the guide dog robot, an external force based on a movement intention of a visually impaired person and a moving motion of the guide dog robot. Also, a force which is transferred to the visually impaired person due to a rapid motion of the guide dog robot may smoothly and immediately act.

Moreover, in an embodiment of the present invention, an inertia measurement unit (IMU) may be installed in each of the harness unit, the spring damper unit, and the body part and may measure a relative change therebetween, and thus, may immediately recognize a relative motion change between the visually impaired person and the guide dog robot, based on an external force applied from the visually impaired person and an external force with which the guide dog robot acts and may transfer a smooth and immediate force therebetween to maintain stable movement.

Hereinafter, a guide dog robot for visually impaired persons 100 (hereinafter referred to as a guide dog robot) according to an embodiment of the present invention will be described with reference to FIGS. 1 to 6.

Figure 2:
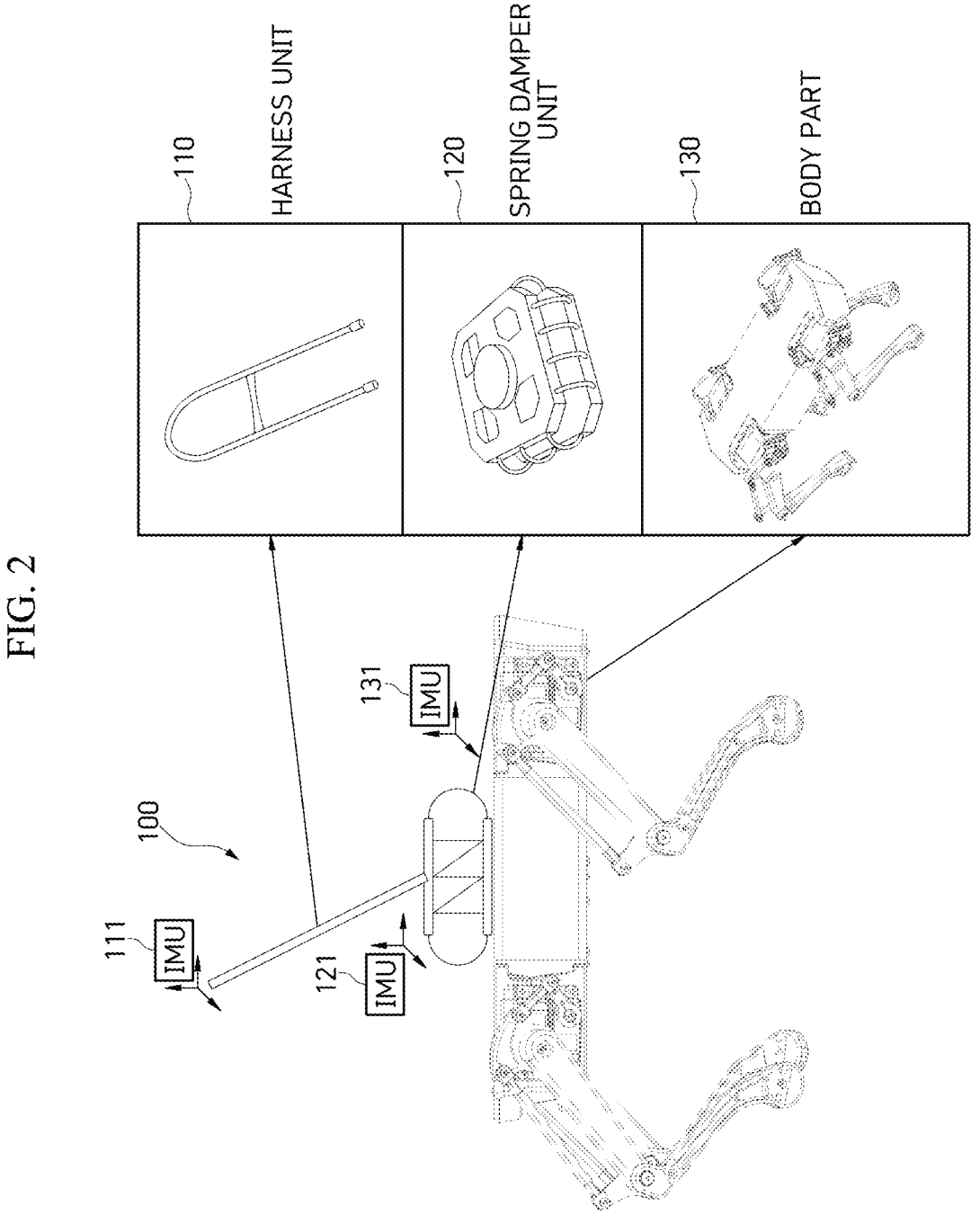
FIG. 2 is a diagram for describing a position relationship of each element of a guide dog robot for visually impaired persons according to an embodiment of the present invention.

FIG. 1 is a block diagram of a guide dog robot 100 for visually impaired persons according to an embodiment of the present invention. FIG. 2 is a diagram for describing a position relationship of each element of the guide dog robot 100 for visually impaired persons according to an embodiment of the present invention.

The guide dog robot 100 according to an embodiment of the present invention may include a harness unit 110, a spring damper unit 120, and a body part 130.

The harness unit 110 may be a region which a visually impaired person grips and may include a 6-axis IMU (hereinafter referred to as a first IMU) 111. The harness unit 110 may measure a position and a speed in a region which a user grips.

The spring damper unit 120 may be connected to the harness unit 110. In this case, the harness unit 110 may be configured to enable free movement to a certain degree through a spring damper and a ring or a hinge structure capable of a forward/rearward-direction rotation.

Figure 3A:
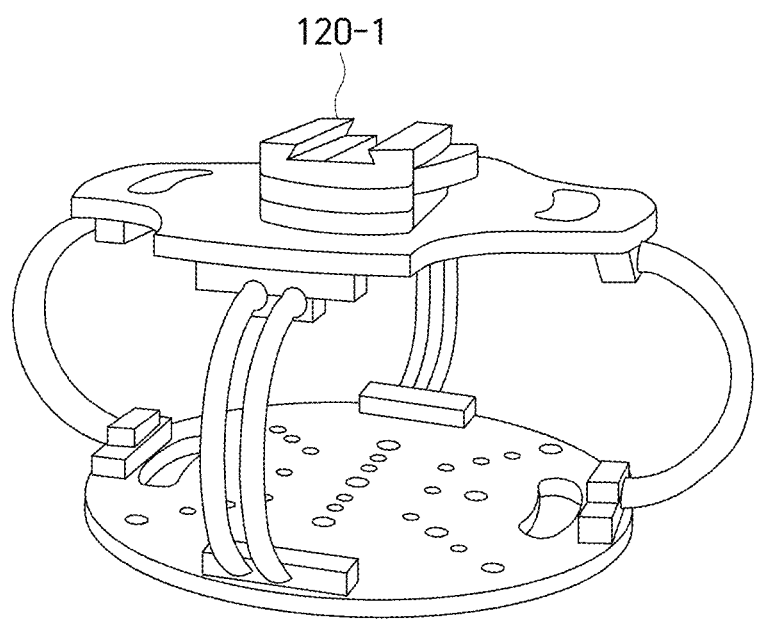
FIGS. 3A and 3B are diagrams illustrating an example of a spring damper unit in an embodiment of the present invention.
Figure 3B:
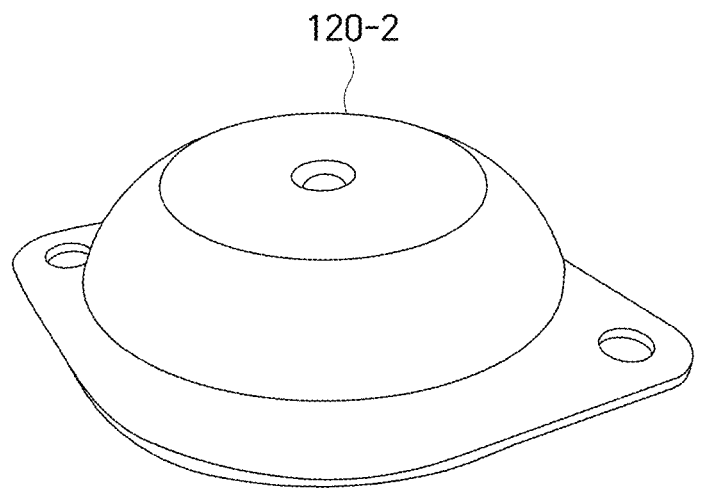

The spring damper unit 120 having such a structure may move in a certain axial direction, based on an external force acting between a visually impaired person and the guide dog robot 100. FIGS. 3A and 3B are diagrams illustrating an example of spring damper units 120-1 and 120-2 in an embodiment of the present invention.

In an embodiment, the spring damper unit 120 may be configured with a 6-axis spring damper which performs a function of a spring damper in a linear direction and a rotational direction of each of an x axis, a y axis, and a z axis. For example, an embodiment of the present invention may be designed so that a vibration isolator is used as a 6-axis spring damper. Such a structure may be implemented by using a vibration isolator including an elastic material such as rubber.

In this case, the spring damper unit 120 should be designed to enable a relative available displacement of each of the visually impaired person and the guide dog robot 100. That is, when movement between the visually impaired person and the guide dog robot 100 occurs, the spring damper unit 120 may provide appropriate elasticity, and thus, an appropriate distance may be maintained and an impact of a certain range may be absorbed.

Moreover, the spring damper unit 120 may be fixed and mounted on an upper surface of the body part 130, and a 6-axis IMU (hereinafter referred to as a second IMU) 121 may be installed on an upper plate of the spring damper unit 120. Accordingly, the spring damper unit 120 may measure a position and a speed at the upper surface of the spring damper unit 120.

The spring damper unit 120 may be mounted on the upper surface of the body part 130, and thus, the body part 130 may perform movement based on a moving motion of the guide dog robot 100 and a movement intention of the visually impaired person. A 6-axis IMU (hereinafter referred to as a third IMU) 131 may be installed on the upper plate of the spring damper unit 120. Accordingly, the body part 130 may measure a position and a speed at the upper surface of the body part 130 of the guide dog robot 100. Also, as described below, the body part 130 may include a detailed element which collects sensing data of each of the IMUs 111, 121, and 131 to control a movement of the guide dog robot 100.

In an embodiment, the body part 130 may obtain a wrist direction and a position of the visually impaired person from a plate of the guide dog robot 100 by using a relative position between the first and third IMUs 111 and 131 calculated based on each position and speed measured by the first IMU 111 and the third IMU 131. That is, the body part 130 may calculate a relative distance and a relative direction between two IMUs 111 and 131, based on position data and speed data of the first and third IMUs 111 and 131 measured in real time. Also, based on the relative distance and the relative direction, the body part 130 may obtain a wrist direction and a position of the visually impaired person from the guide dog robot 100.

However, the 6-axis spring damper unit 120 for removing a burden of the wrist of the visually impaired person and decreasing an external force directly acting on a robot may be equipped between the body part 130 and the harness unit 110, and thus, it may be impossible to immediately calculate a force acting between the guide dog robot 100 and the visually impaired person, based on a relative position.

Accordingly, in an embodiment of the present invention, a movement intention of the visually impaired person expressed as an interaction force or a relative force based on a moving motion of the guide dog robot 100 may be modeled by using a mass-spring-damper model, so as to be expressed as a relationship between a displacement, a speed, and an acceleration with respect to 6 axes.

Figure 4:
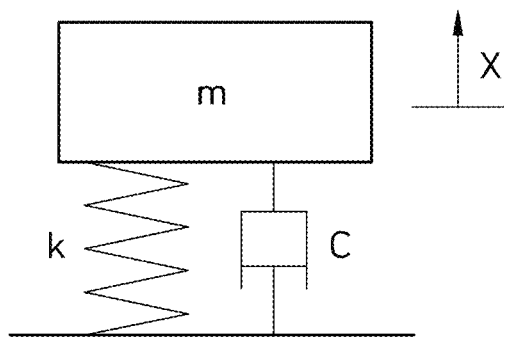
FIG. 4 is a diagram for describing a mass-spring-damper model in an embodiment of the present invention.

FIG. 4 is a diagram for describing a mass-spring-damper model in an embodiment of the present invention.

In detail, a first mass-spring-damper model may be set with respect to each axis between the harness unit 110 and the spring damper unit 120 and may calculate a first interaction force between the harness unit 110 and the spring damper unit 120.

Also, a second mass-spring-damper model may be set with respect to each axis between the spring damper unit 120 and the body part 130 and may calculate a second interaction force between the spring damper unit 120 and the body part 130.

In this case, the mass-spring-damper model may be formulated as the following Equation 1. In Equation 1, m may denote a mass, k may denote a spring coefficient, and c may denote a damper coefficient.

$$mx'' + cx' + kx = F \qquad \text{[Equation 1]}$$

In an embodiment, the body part 130 may set the second mass-spring-damper model with respect to each of 6 axes (linear directions of 3 axes (x, y, and z axes) and rotational directions of 3 axes (x, y, and z axes)) between the spring damper unit 120 and the body part 130.

Moreover, the body part 130 may perform free movement with respect to 6 axes between the harness unit 110 and the spring damper unit 120, and thus, when there is an axis where a spring damper action does not occur in the spring damper unit 120, the first mass-spring-damper model may be set with respect to the other axis except a corresponding axis.

Particularly, the body part 130 may set the first mass-spring-damper model to include an axis where a spring damper action in the spring damper unit 120 acting when the harness unit 110 is twisted in a specific direction occurs.

A relative position, speed, and acceleration with respect to each axis between the harness unit 110 and spring damper unit 120 and the spring damper unit 120 and body part 130 may be obtained through relative measurement between the first to third IMUs 111, 121, and 131, and thus, coefficients on the first and second mass-spring-damper models should be calculated for completing settings of the first and second mass-spring-damper models. When such coefficient calculation is completed, first and second interaction forces with respect to each axis may be calculated through the first and second mass-spring-damper models.

Moreover, first and second interaction forces on a relative position, speed, and acceleration between the harness unit

110-spring damper unit 120 and the spring damper unit 120-body part 130 may be modeled into the first and second mass-spring-damper models having different coefficients for each axis. However, the elements may have the same coefficient with respect to an axis having the same spring-damper properties. For example, in the spring damper illustrated in FIGS. 3A and 3B, linear directions and rotational directions of an x axis and a y axis of the spring damper unit 120-body part 130 may have the same coefficient.

Figure 5:
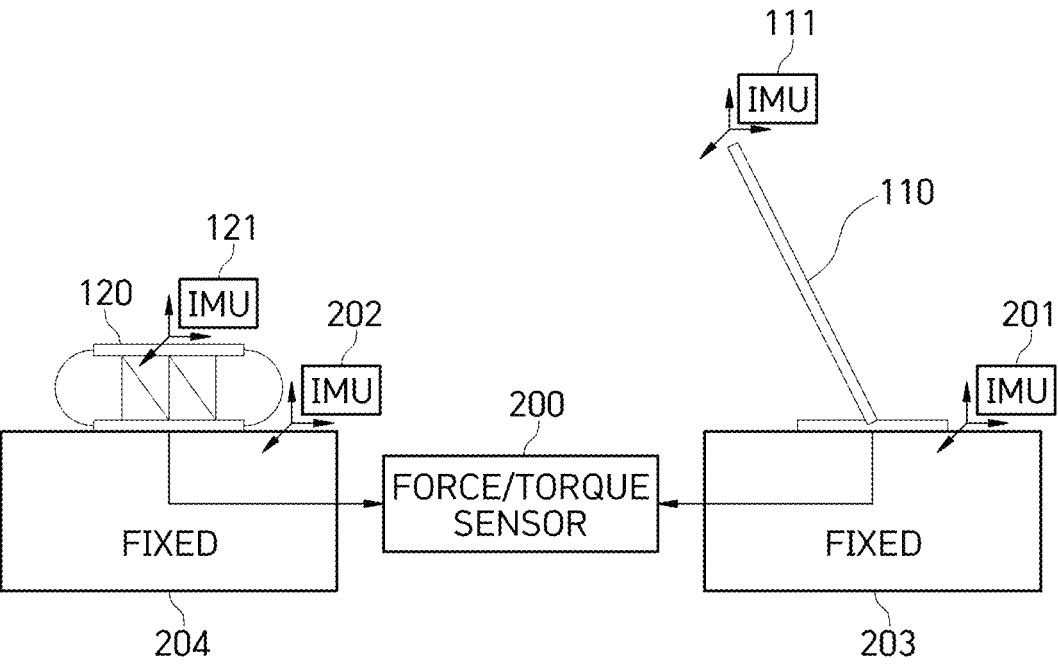
FIG. 5 is a diagram for describing a dataset collection method on a harness unit and a spring damper unit in an embodiment of the present invention.

FIG. 5 is a diagram for describing a dataset collection method on the harness unit 110 and the spring damper unit 120 in an embodiment of the present invention.

To calculate coefficients of first and second mass-spring-damper models with respect to each axis, as illustrated in FIG. 5, in addition to the first and second IMUs 111 and 121, each of additional IMUs 201 and 202 may be installed in a fixed rigid body, on the harness unit 110 and the spring damper unit 120. In this case, the harness unit 110 and the spring damper unit 120 may be mounted like being equipped in the guide dog robot 100. Subsequently, a data set of a relative position, speed, and acceleration and a force may be collected by using a torque sensor 200 or a force at a different point of the spring damper unit 120 to be measured.

Also, m, c, and k coefficients of a mass-spring-damper model with respect to each axis may be obtained through a machine learning technique. That is, the collected data set of relative position, speed, and acceleration and force may be approximated to a measurement value of a data set through regression analysis based on a machine learning technique.

In this case, regression analysis may be performed by using a single layer perceptron (SLP) model, and the SLP model may generate a neural network structure having each coefficient as a weight of one node and may perform regression analysis on each axis, based on the collected data set.

In an embodiment, the body part 130 may calculate a total interaction force for performing movement based on a movement intention of a visually impaired person and a moving motion of the guide dog robot 100 by using a vector sum of the first interaction force and the second interaction force, with respect to an action point of a force set when collecting a data set for setting the first and second mass-spring-damper models.

That is, when the first interaction force is calculated by the first mass-spring-damper model between the body part 130 and the harness unit 110 and spring damper unit 120 and the second interaction force is calculated by the second mass-spring-damper model between the body part 130 and the spring damper unit 120, an action point of each interaction force may be set to a force in collecting a data set and a point at which the torque sensor 200 is mounted, and the first and second interaction forces may be merged. The first and second interaction forces may be converted into a total interaction force which directly acts on the guide dog robot 100 and the visually impaired person through mergence using the vector sum with respect to all axes as in the following Equation 2.

$$F_{spring-damper} + F_{harness} = F_{interact} \qquad \text{[Equation 2]}$$

As described above, the visually impaired person may safely and smoothly recognize relative position and direction changes of the guide dog robot 100 by using the spring damper unit 120 additionally included in an embodiment of the present invention, based on the total interaction force.

Also, a movement intention of the visually impaired person may be stably transferred to the guide dog robot 100, and thus, the guide dog robot 100 may recognize a relative position, speed, and acceleration of the visually impaired person to calculate a force and may use the calculated force as a measurement value for stable feedback control.

Furthermore, in an embodiment of the present invention, the body part 130 may convert the calculated total interaction force into a centroid external force with respect to a center of gravity of the guide dog robot 100 and may compensate for a control input corresponding to each joint of the guide dog robot 100, based on the centroid external force.

That is, it may be needed to reflect an interaction force in a quadruped walking control system, in order to prevent path deviation or unstable walking or rollover caused by an external force acting from the visually impaired person.

To this end, an embodiment of the present invention may compensate for the control input corresponding to each joint of the guide dog robot 100 by converting a total interface force $F_{interact}$ into an external force $F_{external}$ corresponding to a center of gravity of a quadruped walking robot for impedance control and using the external force, and thus, may enable stable control without deviating from a conventional movement path despite the external force acting from the visually impaired person.

As described above, in an embodiment of the present invention, in a case where a visually impaired person performs an orientation (pathfinding and navigation) and the guide dog robot 100 performs mobility (obstacle avoidance and path following movement), the visually impaired person should issue a direction change command to the guide dog robot 100. To this end, an external force acting on the guide dog robot 100 may be minimized by simultaneously using the spring damper unit 120 and the harness unit 110. Accordingly, the guide dog robot 100 may be stably controlled and may follow an intended direction of the visually impaired person to move.

Furthermore, in an embodiment of the present invention, curvature information about a moving path may be further reflected when calculating at least one of the first and second interaction forces. For example, in a case where map information is included in a dictionary, when it is determined that a current position is a curved road, curvature information about a current curved road may be calculated based on the map information. Also, the calculated curvature information may be reflected in an interaction force.

On the other hand, in a case where the map information is not included in the dictionary, the amount of variation of an interaction force may be calculated when moving on a curved road, and thus, whether a road is the curved road may be determined. Also, when it is determined that the road is the curved road, curvature information about a corresponding curved road may be reflected in the interaction force, and thus, a moving motion of the guide dog robot 100 may be more accurately controlled.

Furthermore, sensing information based on a camera or a LiDAR included in the guide dog robot 100 may be additionally used for estimating curvature information.

Moreover, an embodiment of the present invention may measure and store a distance between the guide dog robot 100 and the visually impaired person and may measure a relative position capable of stable guide, based on the measured distance, and may provide the measured position to the visually impaired person in an alarm form. That is, when the measured position is close to a predetermined first threshold value or less and is farther away from a predetermined second threshold value or more, an embodiment of the present invention may provide a notice so that an interval between the visually impaired person and the guide dog robot 100 is maintained between the first threshold value and the second threshold value.

Moreover, an embodiment of the present invention may configure a first bounding box corresponding to the guide dog robot 100 and a second bounding box corresponding to the visually impaired person, based on position information measured by each of the first to third IMUs 111, 121, and 131, and the guide dog robot 100 may guide the visually impaired person, based on each bounding box region. Fundamentally, in a case where the guide dog robot 100 generates a path plan for guide or performs obstacle avoidance, the guide dog robot 100 may generate a path with respect to the guide dog robot 100 to guide the visually impaired person. In this case, when the visually impaired person is located in a diagonal line instead of a straight line with respect to the guide dog robot 100, the visually impaired person may collide with another obstacle. To solve such a problem, an embodiment of the present invention may generate each of the first and second bounding boxes and may generate a path including the first and second bounding boxes. For example, an embodiment of the present invention may generate a path with respect to a center of the first and second bounding boxes, and in a case which is located in a diagonal direction, an embodiment of the present invention may reconfigure a region of the first and second bounding boxes perpendicular to an overlap current road and may generate a path with respect to a center of a reconfigured entire bounding box.

Figure 6:
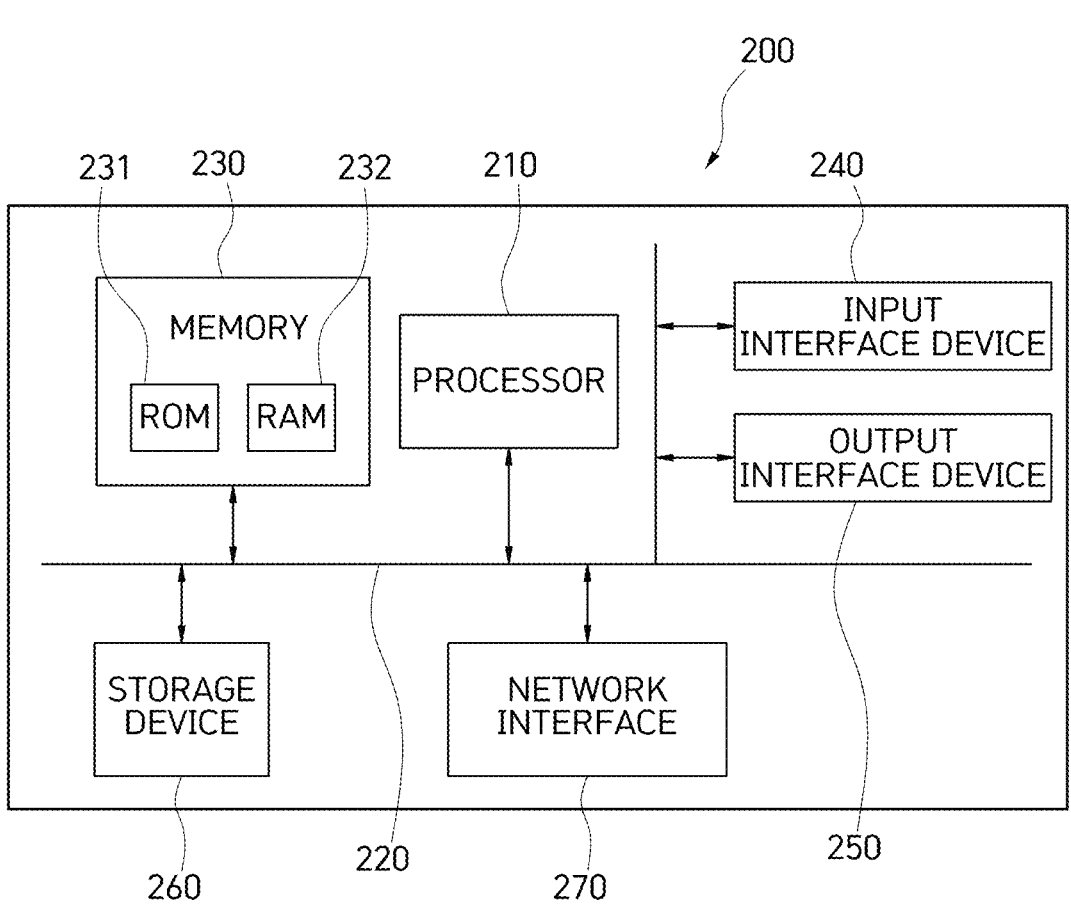
FIG. 6 is a diagram illustrating a configuration of a body part according to an embodiment of the present invention.

FIG. 6 is a diagram illustrating a configuration of the body part 130 according to an embodiment of the present invention.

The body part 130 according to an embodiment of the present invention may be configured as a computing device 200. The computing device 200 may include at least one of a processor 210, a memory 230, a user interface input device (or an input unit) 240, a user interface output device 250, and a storage device 260, which communicate with each other through a bus 220. The computing device 200 may include a network interface (or a communication module) 270 which is electrically connected to a network (for example, a wired network). The network interface 270 may transmit or receive data to or from another network entity over a network.

The processor 210 may be implemented as various kinds such as an application processor (AP), a central processing unit (CPU), and a graphics processing unit (GPU) and may be an arbitrary semiconductor device which executes an instruction stored in the memory 230 or the storage device 260.

The memory 230 and the storage device 260 may include various types of volatile or non-volatile storage mediums. For example, the memory 230 may include read-only memory (ROM) 231 and random access memory (RAM) 232. In an embodiment of the present invention, the memory 230 may be disposed in or outside the processor 210, and the memory 230 may be connected to the processor 210 through various means known to those skilled in the art.

FIG. 7 is a flowchart of a control method of the guide dog robot 100 for visually impaired persons according to an embodiment of the present invention.

First, in step S110, the spring damper unit 120 connected to the harness unit 110 gripped by a visually impaired person may move in an axial direction, based on an external force acting between the visually impaired person and the guide dog robot 100.

Subsequently, in step S120, the IMU may sense a position and a speed at an equipped position by using the IMU included in each of the harness unit 110, the spring damper unit 120, and the body part 130 with the spring damper unit 120 mounted on the upper surface thereof.

Subsequently, in step S130, the body part 130 may perform movement based on a movement intention of the visually impaired person and a moving motion of the guide dog robot 100, based on the sensed position and speed.

Furthermore, in the above description, steps S110 to steps S130 may be more divided into additional steps, or may be combined as fewer steps, based on an implementation example of the present invention. Also, some steps may be omitted depending on the case, or the order of steps may be changed. Also, despite other omitted details, the descriptions of FIGS. 1 to 6 and the description of FIG. 7 may be mutually applied to each other.

The guide dog robot 100 and the control method according to an embodiment of the present invention described above may be implemented as a program (or an application) and may be stored in a medium, so as to be executed in connection with a computer which is hardware.

The program described above may include a code encoded as a computer language such as C, C++, JAVA, Ruby, or machine language readable by a processor (CPU) of a computer through a device interface of the computer, so that the computer reads the program and executes the methods implemented as the program. Such a code may include a functional code associated with a function defining functions needed for executing the methods, and moreover, may include an execution procedure-related control code needed for executing the functions by using the processor of the computer on the basis of a predetermined procedure. Also, the code may further include additional information, needed for executing the functions by using the processor of the computer, or a memory reference-related code corresponding to a location (an address) of an internal or external memory of the computer, which is to be referred to by a media. Also, when the processor needs communication with a remote computer or server so as to execute the functions, the code may further include a communication-related code corresponding to a communication scheme needed for communication with the remote computer or server and information or a media to be transmitted or received in performing communication, by using a communication module of the computer.

The stored medium may denote a device-readable medium semi-permanently storing data, instead of a medium storing data for a short moment like a register, a cache, and a memory. In detail, examples of the stored medium may include read only memory (ROM), random access memory (RAM), CD-ROM, a magnetic tape, floppy disk, and an optical data storage device, but are not limited thereto. That is, the program may be stored in various recording mediums of various servers accessible by the computer or various recording mediums of the computer of a user. Also, the medium may be distributed to computer systems connected to one another over a network and may store a code readable by a computer in a distributed scheme.

The foregoing description of the present invention is for illustrative purposes, those with ordinary skill in the technical field of the present invention pertains in other specific forms without changing the technical idea or essential features of the present invention that may be modified to be able to understand. Therefore, the embodiments described above, exemplary in all respects and must understand that it is not limited. For example, each component may be distributed and carried out has been described as a monolithic and describes the components that are to be equally distributed in combined form, may be carried out.

According to an embodiment of the present invention described above, an interaction between a guide dog robot and a visually impaired person may be optimized, and thus, safe movement may be possible while avoiding a T walking obstacle.

According to an embodiment of the present invention, a guide dog robot may intuitively determine a movement intention of a visually impaired person by measuring a position and a speed with an IMU and a physical interaction based on a harness, and thus, may quickly understand a command of the visually impaired person and may guide a walking path to a planned path.

Moreover, a burden applied to a wrist and an arm of a visually impaired person may be reduced by stably transferring an external force transferred through a harness, and thus, the visually impaired person may more comfortably manipulate a guide dog robot and may concentrate on pathfinding.

Moreover, stable control may be enabled so that a stable interaction force is transferred to a guide dog robot through a harness and a spring damper. Accordingly, instability capable of occurring in walking may be minimized, and the safety of the guide dog robot may be guaranteed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A guide dog robot for visually impaired persons, the guide dog robot comprising:

a harness unit configured to grip be gripped by a visually impaired person;

a spring damper unit connected to the harness unit and configured to move in an axial direction, based on an external force acting between the visually impaired person and the guide dog robot; and a body part configured to perform movement based on a movement intention of the visually impaired person and a moving motion of the guide dog robot, the body part including an upper surface with the spring damper unit mounted thereon, wherein each of the harness unit, the spring damper unit, and the body part comprises an inertia measurement unit (IMU), and the IMU measures a position and a speed at a position at which the IMU is equipped, wherein the body part calculates a first interaction force between the harness unit and the spring damper unit, based on a first mass-spring-damper model set with respect to each axis between the harness unit and the spring damper unit, and calculates a second interaction force between the spring damper unit and the body part, based on a second mass-spring-damper model set with respect to each axis between the spring damper unit and the body part.

2. The guide dog robot of claim 1, wherein the spring damper unit is a 6-axis spring damper configured to perform a function of a spring damper in a linear direction and a rotational direction of each of an x axis, a y axis, and a z axis.

3. The guide dog robot of claim 1, wherein the body part obtains a wrist direction and a position of the visually impaired person by using a relative position between the IMUs calculated based on each of positions and speeds measured by the IMU of the body part and the IMU of the harness unit.

4. The guide dog robot of claim 1, wherein, when there is an axis where a spring damper action of the spring damper unit does not occur, the body part sets the first mass-spring-damper model with respect to the other axis except the axis where the spring damper action does not occur.

5. The guide dog robot of claim 1, wherein the body part sets the first mass-spring-damper model to include an axis where a spring damper action of the spring damper unit acting when the harness unit is twisted in a specific direction occurs.

6. The guide dog robot of claim 1, wherein the body part calculates a total interaction force for performing movement based on a movement intention of the visually impaired person and a moving motion of the guide dog robot by using a vector sum of the first interaction force and the second interaction force, with respect to an action point of a force set when collecting a data set for setting the first and second mass-spring-damper models.

7. The guide dog robot of claim 6, wherein the body part converts the calculated total interaction force into a centroid external force with respect to a center of gravity of the guide dog robot and compensates for a control input corresponding to each joint of the guide dog robot, based on the centroid external force.

8. A control method of a guide dog robot for visually impaired persons, the control method comprising:

a step of moving a spring damper unit, connected to a harness unit gripped by a visually impaired person, in an axial direction by using an external force acting between the visually impaired person and the guide dog robot;

a step of sensing a position and a speed at an equipped position by using an inertia measurement unit (IMU) included in each of the harness unit, the spring damper unit, and a body part with the spring damper unit mounted on an upper surface thereof; and a step of performing movement based on a movement intention of the visually impaired person and a moving motion of the guide dog robot by using the body part, based on the sensed position and speed, wherein the step of performing the movement based on the movement intention of the visually impaired person and the moving motion of the guide dog robot comprises:

a step of calculating a first interaction force between the harness unit and the spring damper unit, based on a first mass-spring-damper model set with respect to each axis between the harness unit and the spring damper unit; and a step of calculating a second interaction force between the spring damper unit and the body part, based on a second mass-spring-damper model set with respect to each axis between the spring damper unit and the body part.

9. The control method of claim 8, wherein the step of performing the movement based on the movement intention of the visually impaired person and the moving motion of the guide dog robot comprises a step of obtaining a wrist direction and a position of the visually impaired person by using a relative position between the IMUs calculated based on each of positions and speeds measured by the IMU of the body part and the IMU of the harness unit.

10. The control method of claim 8, wherein the step of performing the movement based on the movement intention of the visually impaired person and the moving motion of the guide dog robot comprises, when there is an axis where a spring damper action of the spring damper unit does not occur, a step of setting the first mass-spring-damper model with respect to the other axis except the axis where the spring damper action does not occur.

11. The control method of claim 8, wherein the step of performing the movement based on the movement intention of the visually impaired person and the moving motion of the guide dog robot comprises a step of setting the first mass-spring-damper model to include an axis where a spring damper action of the spring damper unit acting when the harness unit is twisted in a specific direction occurs.

12. The control method of claim 8, wherein the step of performing the movement based on the movement intention of the visually impaired person and the moving motion of the guide dog robot comprises:

a step of calculating a vector sum of the first interaction force and the second interaction force with respect to an action point of a force set when collecting a data set for setting the first and second mass-spring-damper models; and a step of calculating a total interaction force for performing movement based on a movement intention of the visually impaired person and a moving motion of the guide dog robot, based on the calculated vector sum.

13. The control method of claim 12, wherein the step of performing the movement based on the movement intention of the visually impaired person and the moving motion of the guide dog robot comprises:

a step of converting the calculated total interaction force into a centroid external force with respect to a center of gravity of the guide dog robot; and a step of compensating for a control input corresponding to each joint of the guide dog robot, based on the centroid external force.

14. A guide dog robot for visually impaired persons, the guide dog robot comprising:

a communication module configured to receive sensing data of an inertia measurement unit (IMU) included in each of a harness unit gripped by a visually impaired person, a spring damper unit connected to the harness unit, and a body part with the spring damper unit mounted on an upper surface thereof;

a memory configured to store a program for performing a movement of the guide dog robot, based on the sensing data; and a processor configured to, as the spring damper unit moves in an axial direction with an external force acting between the visually impaired person and the guide dog robot by executing the program stored in the memory, obtain a position and a speed at an equipped position, based on the sensing data from each IMU, and control movement based on the movement intention of the visually impaired person and the moving motion of the guide dog robot, based on the obtained position and speed, wherein the processor is further configured to calculate a first interaction force between the harness unit and the spring damper unit, based on a first mass-spring-damper model set with respect to each axis between the harness unit and the spring damper unit, and calculate a second interaction force between the spring damper unit and the body part, based on a second mass-spring-damper model set with respect to each axis between the spring damper unit and the body part.

\* \* \* \* \*